(12) United States Patent
Ahmed et al.

(10) Patent No.: US 7,443,798 B2
(45) Date of Patent: Oct. 28, 2008

(54) TRANSMIT ADAPTIVE EQUALIZATION FOR COMMUNICATION SYSTEM WITH ONE OR MORE SERIAL DATA CHANNELS

(75) Inventors: Ali U. Ahmed, Macungie, PA (US); Robert D. Brink, Coopersburg, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 820 days.

(21) Appl. No.: 10/933,708

(22) Filed: Sep. 3, 2004

(65) Prior Publication Data

US 2006/0050726 A1 Mar. 9, 2006

(51) Int. Cl.
*G01R 31/08* (2006.01)
(52) U.S. Cl. .................. 370/236; 370/410; 375/220; 375/233
(58) Field of Classification Search ............. 370/252, 370/236, 465, 437; 375/135–136, 146–147, 375/219–223, 229–236
See application file for complete search history.

(56) References Cited

U.S. PATENT DOCUMENTS

| | | | |
|---|---|---|---|
| 5,598,541 A * | 1/1997 | Malladi | 710/106 |
| 7,277,477 B1 * | 10/2007 | Ahmad | 375/220 |
| 2004/0003062 A1 * | 1/2004 | Sharma et al. | 709/220 |
| 2004/0037264 A1 * | 2/2004 | Khawand | 370/349 |
| 2005/0031347 A1 * | 2/2005 | Soto et al. | 398/58 |
| 2005/0089334 A1 * | 4/2005 | Regev et al. | 398/139 |
| 2006/0067387 A1 * | 3/2006 | Ahmed et al. | 375/219 |

OTHER PUBLICATIONS

U.S. Appl. No. 10/955,997, filed Sep. 30, 2004, A.U. Ahmed et al., "Transmit Adaptive Equalization Using Ordered Sets."

* cited by examiner

*Primary Examiner*—Chi H. Pham
*Assistant Examiner*—Thai D. Hoang
(74) *Attorney, Agent, or Firm*—Rayn, Mason & Lewis, LLP (57) ABSTRACT

In a communication system comprising first and second nodes, a transmit adaptive equalization technique is implemented. The first and second nodes may communicate over a Fiber Channel link or other medium. The first and second nodes comprise respective transmitter and receiver pairs, with the transmitter of the first node configured for communication with the receiver of the second node and the receiver of the first node configured for communication with the transmitter of the second node. The first node receiver is operative to receive from the second node transmitter, responsive to a signal transmitted by the first node transmitter to the second node receiver, information specifying an adjustment to one or more equalization parameters of the first node transmitter. The first node adjusts the equalization parameter(s) in accordance with the received information.

21 Claims, 4 Drawing Sheets

| Word 0 | | Word 2 | Word 5 | Description | Abbr. |
|---|---|---|---|---|---|
| Routing (31-28) | Command (27-24) | Type | Parameter | | |
| 0x08 | 0x7 | 0x00 | Action | Perform Transmit Adaptive Equalization | PTAE |

| Word 0 | | Word 2 | Word 5 | Payload | Abbr. |
|---|---|---|---|---|---|
| Routing (31-28) | Info (27-24) | Type | Parameter | | |
| 0x02 | 0x02 | 0x01 | N/A | Perform Transmit Adaptive Equalization | PTAE |

FIG. 5

| Byte 0 | ELS Request PTAE (0x7F) |
|---|---|
| Byte 1 | Parameters for PTAE defined in FIG. 4 |
| Byte 2 | |
| Byte 3 | Reserved |

TRANSMIT ADAPTIVE EQUALIZATION FOR COMMUNICATION SYSTEM WITH ONE OR MORE SERIAL DATA CHANNELS

FIELD OF THE INVENTION

The present invention relates generally to communication systems, and more particularly to equalization techniques for use in communications systems comprising, by way of example, one or more Fibre Channel links or other bidirectional serial data channels.

BACKGROUND OF THE INVENTION

As is well known, Fibre Channel (FC) is an American National Standards Institute (ANSI) standard specifying a bidirectional serial data channel, structured for high performance capability. Physically, the Fibre Channel may be viewed as an interconnection of multiple communication points, called N_Ports, interconnected by a link comprising a switching network, called a fabric, or a point-to-point link. Fibre is a general term used to cover all physical media types supported by the Fibre Channel, such as optical fibre, twisted pair, and coaxial cable.

The Fibre Channel provides a general transport vehicle for Upper Level Protocols (ULPs) such as Intelligent Peripheral Interface (IPI) and Small Computer System Interface (SCSI) command sets, High-Performance Parallel Interface (HIPPI) data framing, IP (Internet Protocol), IEEE 802.2, and others. Proprietary and other command sets may also use and share the Fibre Channel, but such use is not defined as part of the Fibre Channel standard.

Fibre Channel is structured as a set of hierarchical functions denoted FC-0, FC-1, FC-2, FC-3 and FC-4.

FC-0 defines the physical portions of the Fibre Channel including the fibre, connectors, and optical and electrical parameters for a variety of data rates and physical media. Coax and twisted pair versions are defined for limited distance applications. FC-0 provides the point-to-point physical portion of the Fibre Channel. A variety of physical media is supported to address variations in cable plants.

FC-1 defines the transmission protocol which includes the serial encoding, decoding, and error control.

FC-2 defines the signaling protocol which includes the frame structure and byte sequences.

FC-3 defines a set of services which are common across multiple ports of a node.

FC-4 is the highest level in the Fibre Channel standard. It defines the mapping, between the lower levels of the Fibre Channel and the IPI and SCSI command sets, the HIPPI data framing, IP, and other ULPs.

Additional details regarding these and other aspects of Fibre Channel can be found in the ANSI Fibre Channel standard documents, including the FC-PH, FC-FS, FC-AL, FC-PI, FC-DA and FC-LS documents, all of which are incorporated by reference herein.

In typical conventional practice, Fibre Channel links are designed to operate at data rates of 4.25 Gbps, 2.125 Gbps or 1.0625 Gbps. Although higher data rates are possible, the industry is reluctant to spend money upgrading existing hardware to implement these higher data rates. The problem is that as data rates increase, to the proposed Fibre Channel rates of 8 Gbps, 16 Gbps and higher, the existing hardware degrades the electrical signals to the extent that error-free operation cannot be achieved without electrical equalization.

Current implementations generally attempt to address this problem through the use of pure receive equalization. However, at high data rates, on the order of 8 Gbps or higher, this receive-only equalization approach is very complicated, and requires significant increases in size and power consumption for the associated hardware. Moreover, the receive-only equalization approach may fail to provide the desired error-free operation at the high data rates.

Accordingly, what is needed is an improved approach to equalization for Fibre Channel or other bidirectional serial data channels, which can accommodate higher data rates without the need for hardware infrastructure upgrades while also avoiding the drawbacks of conventional receive-only equalization.

SUMMARY OF THE INVENTION

The present invention provides techniques for transmit adaptive equalization that overcome one or more of the drawbacks of conventional practice.

In accordance with one aspect of the invention, a transmit adaptive equalization technique is implemented in a communication system comprising first and second nodes. The first and second nodes may communicate over a Fibre Channel link or other medium. The first and second nodes comprise respective transmitter and receiver pairs, with the transmitter of the first node configured for communication with the receiver of the second node and the receiver of the first node configured for communication with the transmitter of the second node. The first node receiver is operative to receive from the second node transmitter, responsive to a signal transmitted by the first node transmitter to the second node receiver, information specifying an adjustment to one or more equalization parameters of the first node transmitter. The first node adjusts the one or more equalization parameters in accordance with the received information.

In an illustrative embodiment, the second node evaluates signal quality of the signal transmitted by the transmitter of the first node, and determines the information specifying the adjustment to the equalization parameters based on the signal quality evaluation. The process of transmitting a signal and receiving information specifying an adjustment to the equalization parameters may be repeated until signal quality of a given transmitted signal as received at the second node is determined to meet one or more designated criteria.

As a more particular example, the equalization parameters may comprise a plurality of tap coefficients of a finite impulse response (FIR) filter associated with the transmitter of the first node. The information specifying an adjustment to the equalization parameters in this example may comprise, for a particular one of the plurality of coefficients, at least one of an increment coefficient action, a decrement coefficient action, and a hold coefficient action.

In accordance with another aspect of the invention, the information specifying an adjustment to the equalization parameters of the transmitter of the first node may be transmitted utilizing new link services commands, disclosed herein, that are in a format compliant with the Fibre Channel standard. For example, the information may be transmitted as a request command utilizing a Basic Link Services (BLS) command format or an Extended Link Services (ELS) command format.

A transmit adaptive equalization process in accordance with the invention may therefore be carried out after a Fibre Channel link between the first and second nodes has been initialized and become operational.

In accordance with a further aspect of the invention, a transmit adaptive equalization process implemented by the first and second nodes may be repeated periodically so as to provide periodic re-evaluation of signal quality and additional equalization parameter adjustments as needed in the course of normal operation. Such a process may be carried out, for example, during otherwise idle periods in data communication between the first and second nodes.

The present invention in the illustrative embodiments provides a number of significant advantages over the conventional techniques previously described. For example, the illustrative embodiments can accommodate higher Fibre Channel data rates, such as 8 Gbps, 1.6 Gps and higher, without the need for hardware infrastructure upgrades. In addition, substantially improved performance relative to conventional receive-only equalization is provided, with minimal impact to existing protocols of the Fibre Channel standard. Furthermore, the transceiver hardware area and power consumption required for equalization are considerably reduced.

DETAILED DESCRIPTION OF THE INVENTION

The invention will be illustrated herein in conjunction with exemplary communication systems comprising one or more bidirectional point-to-point serial data channels configured in accordance with the ANSI Fibre Channel standard. It should be understood, however, that the invention is more generally applicable to any system comprising one or more serial data channels in which it is desirable to provide improved equalization so as to facilitate operation at high data rates.

Figure 1:
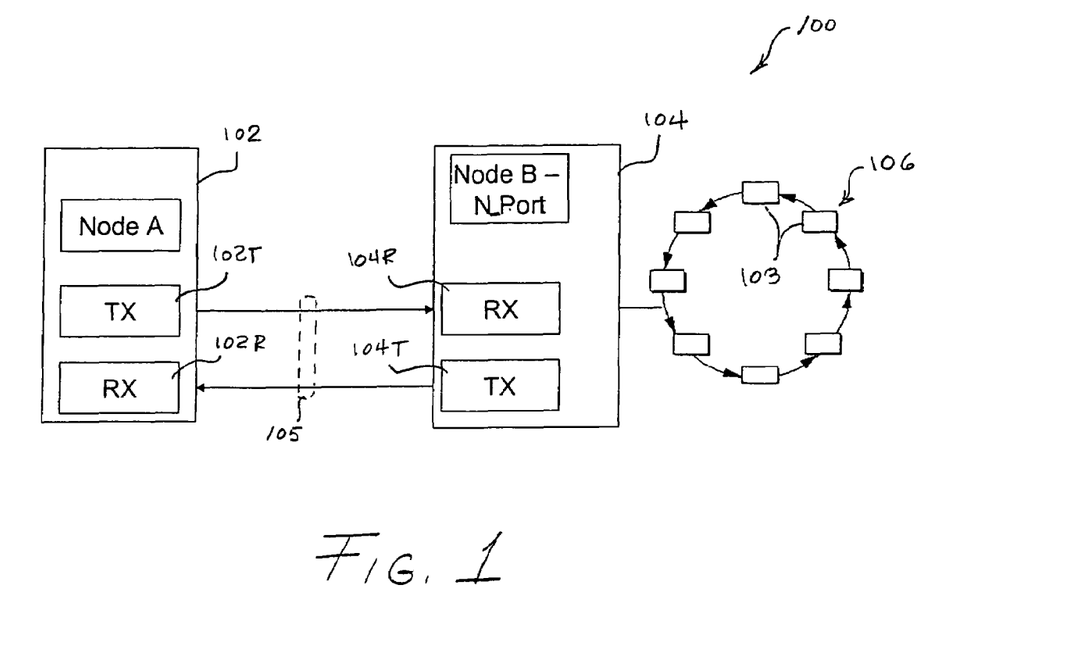
FIGS. 1 and 2 are simplified block diagrams showing exemplary Fibre Channel communication systems in which the present invention is implemented.

FIG. 1 shows a portion of a communication system 100 in which the present invention is implemented. The system 100 comprises a first node 102, also denoted as Node A, and a second node 104, also denoted as Node B. The two nodes are connected by a bidirectional serial data channel transmission medium 105, also referred to herein as a "link." Node A comprises a transmitter 102T configured for communication with a receiver 104R of Node B, and a receiver 102R configured for communication with a transmitter 104T of Node B. In this embodiment, Node A can be an N_Port or an F_Port, and Node B can be an N_Port, an NL_Port (also referred to as an L_Port), or an FL_Port, as defined in the above-cited documents of the Fibre Channel standard.

A given N_Port comprises a Link_Control_Facility in accordance with the Fibre Channel standard. A Link_Control_Facility is a link hardware facility which attaches to an end of a link and manages transmission and reception of data.

In the particular arrangement shown, Node B is further configured as a backplane which connects to an arbitrated loop 106 of NL_Ports 108. The NL_Ports 108 in this embodiment may comprise, for example, Fibre Channel Hard Disk Drives (HDDs), and may support multiple data rates, such as, for example, data rates of 4, 8, 10 and 16 Gbps.

Figure 2:
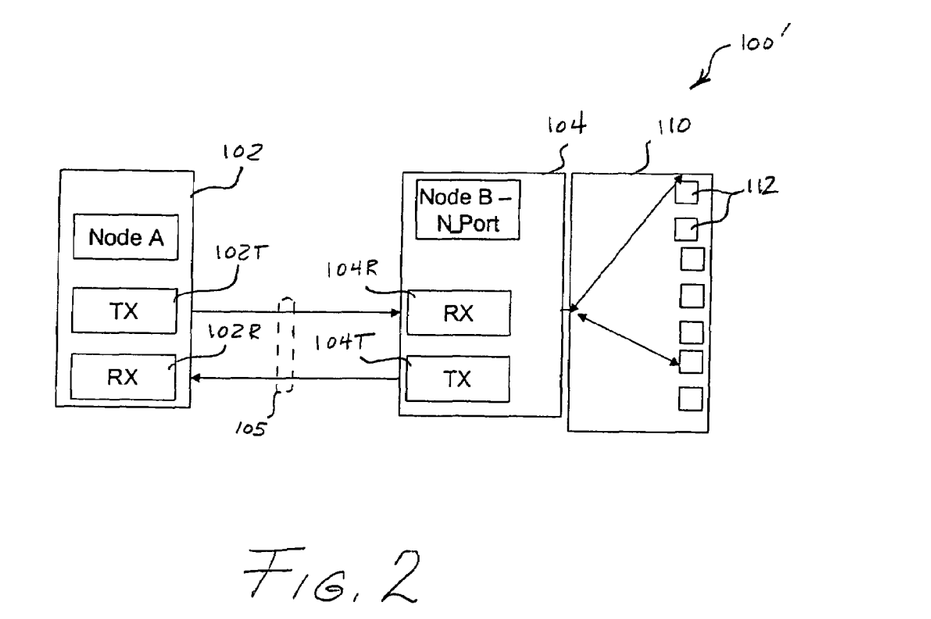

FIG. 2 shows one possible alternative topology of a system 100' comprising Node A and Node B. In this arrangement, Node B is again configured as a backplane, but this time connected to an element 110 comprising a plurality of NL_Ports or FL_Ports 112 that may be, for example, Fibre Channel HDDs. Like the elements 108 of the FIG. 1 example, the elements 112 in this example may support multiple data rates, such as the above-noted data rates of 4, 8, 10 and 16 Gbps.

In both FIG. 1 and FIG. 2, the Node B transceivers are illustratively part of a backplane that is comprised of NL_Ports or FL_Ports.

It is to be appreciated that the particular numbers of nodes shown in FIGS. 1 and 2, and their particular topology and configuration, are presented by way of illustrative example only. Other embodiments of the invention can include different numbers and arrangements of nodes. For example, various topologies based on fabric interconnection of the nodes are possible. The invention is also applicable to topologies such as those described in the above-cited FC-DA document of the Fibre Channel standard, as well as other Fibre Channel topologies.

The present invention in the illustrative embodiments provides transmit adaptive equalization in a Fibre Channel system such as system 100 of FIG. 1 or system 100' of FIG. 2. Generally, a first one of the nodes 102, 104 transmits a signal to the other node, also referred to as the second node. The second node evaluates the signal quality of the received signal, and sends to the first node a request command or other information specifying an adjustment to one or more equalization parameters of the first node transmitter. The equalization parameter(s) of the first node transmitter are then adjusted in accordance with the received information. For example, the equalization parameters may comprise a plurality of tap coefficients of a finite impulse response (FIR) filter associated with the transmitter of the first node. Other filter mechanisms may be used to provide similar functionality.

The request command or other information specifying an adjustment to the equalization parameter(s) of the transmitter of the first node may be transmitted, by way of example, utilizing link services command formats compliant with the Fibre Channel standard. More specifically, a BLS command format may be used, as will be described below in conjunction with FIG. 3, or an ELS command format may be used, as will be described below in conjunction with FIGS. 5 and 6. Both techniques generally involve the performance of transmit adaptive equalization through an iterative process of request command and reply.

Thus, the invention in the illustrative embodiments provides feedback mechanisms which utilize the link services functions of the existing Fibre Channel standard to communicate equalization messages between transmitting and receiving nodes.

As indicated above, the equalization parameter adjustment process may be repeated iteratively, until the transmitter and receiver of the respective first and second nodes arrive at a set of equalization parameters which provide a desired signal quality at the receiver.

The signal quality determination implemented in the receiving node can also be used to adjust receive equalization parameters, for example, using an otherwise conventional receive equalization approach. By sharing the equalization task between the transmitter and the receiver in a given node pair using the techniques of the present invention, the overall solution is likely to be more efficient in terms of hardware area and power requirements than a conventional receive-only equalization approach.

Figure 3:
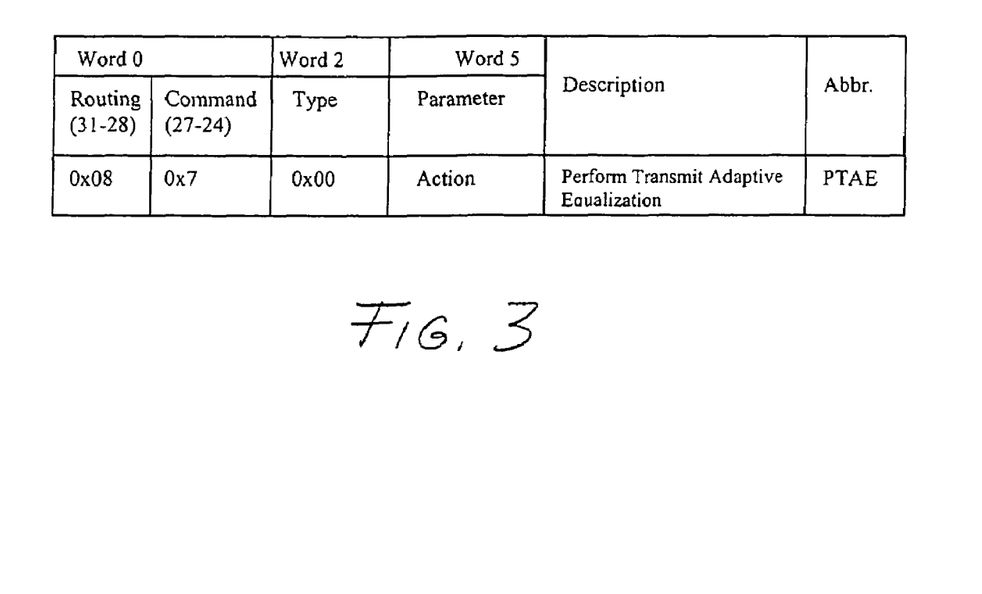
FIG. 3 shows a Basic Link Services (BLS) command format for performance of transmit adaptive equalization in accordance with an illustrative embodiment of the invention.

Referring now to FIG. 3, an exemplary Perform Transmit Adaptive Equalization (PTAE) command format for a BLS technique of the invention is shown. The format includes an otherwise conventional six-word Fibre Channel frame header, with routing information (R-CTL) in bits 31-28 of Word 0, a command code in bits 27-24 of Word 0, a type indicator in bits 24-31 of Word 2, and a parameter field in Word 5. The routing information is 0x08, which indicates basic link data. The command code 0x07 is a new command code, not utilized in conventional implementations of the Fibre Channel standard, and denotes the PTAE command in accordance with the present invention. However, numerous other codes could be utilized to denote a PTAE command. BLS commands 0x00 through 0x06 are defined in the previously-cited FC-PH document, while values beyond 0x06 are reserved. The type indicator is 0x00, which indicates BLS. The parameter field bits 0 to 15 will contain information specifying a particular action relating to adjustment of equalization parameters, examples of which will be described in conjunction with FIG. 4. Other frame header values such as source, destination, sequence, exchange, etc. will be set in a manner consistent with conventional practice, as will be readily appreciated by those skilled in the art.

Figure 4:
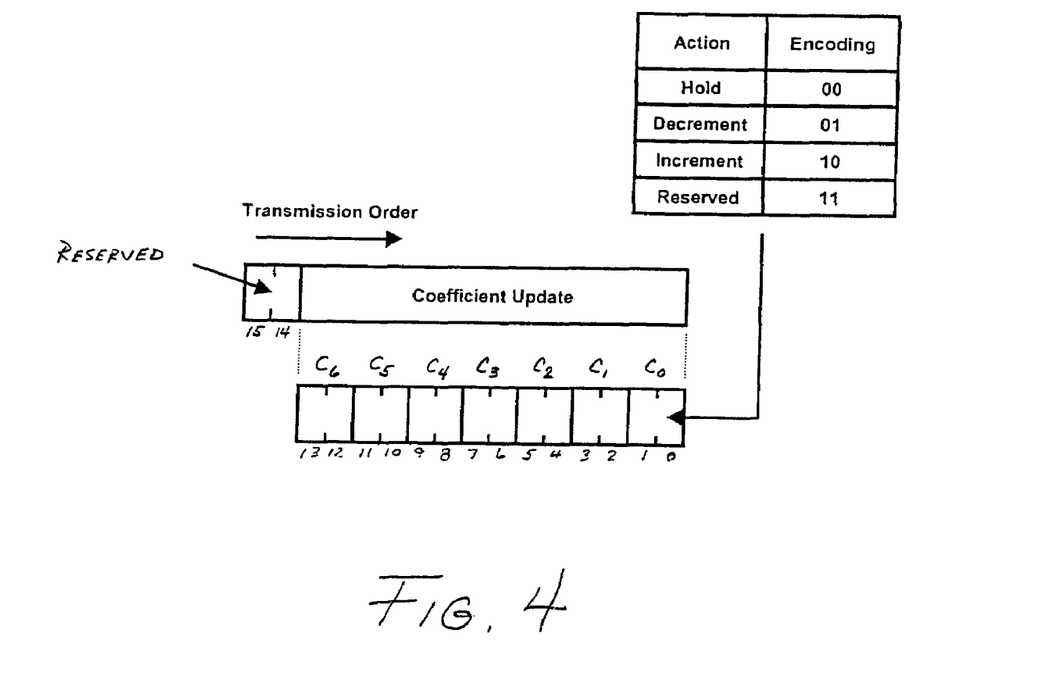
FIG. 4 is a diagram showing an example of transmit adaptive equalization using the BLS command format of FIG. 3.

In the FIG. 4 example, the parameter field includes two reserved bits (bits 14 and 15) and fourteen coefficient update bits (bits 0 to 13). In the coefficient update bits, there are two bits for each of seven coefficients. The seven coefficients, each of which corresponds to a tap of an FIR filter in the present embodiment, are denoted $c_6$, $c_5$, $c_4$, $c_3$, $c_2$, $c_1$ and $c_0$. For each of the coefficients, a corresponding action is encoded using the associated pair of bits. The possible actions in this example include Hold, Decrement, and Increment, encoded by bit pairs 00, 01, and 10, respectively. In the case of a given Hold action, the corresponding coefficient remains unchanged, while for Decrement or Increment actions, the corresponding coefficients are adjusted downward or upward, respectively, by a designated amount. The particular amount of the adjustment will typically depend on implementation-specific factors, such as the type of equalization algorithm being used, and numerous suitable arrangements will be readily apparent to those skilled in the art. The transmit adaptive equalization process is considered complete when the coefficient update bits for each of the coefficients are set to the Hold value, indicating that optimum coefficients have been established for all filter taps.

The FIG. 4 example supports parallel update of transmitter FIR coefficients to a maximum of seven taps, although the technique can be adapted in a straightforward manner to handle more or fewer taps. It is not necessary for a given implementation to support all of the taps that can be accommodated by the command format. The technique does not require any particular tap weight resolution, and is tolerant of corrupted or lost coefficient updates. Actions applied to unsupported taps are ignored.

The BLS technique as implemented by node 102 (Node A) and node 104 (Node B) of system 100 or system 100' generally proceeds as follows. After a Fibre Channel link is established between Node A and Node B, the receiver 104R of Node B monitors received signal quality. This may involve, for example, monitoring signal levels at particular filter taps to determine if overshoot or other designated signal condition is present. Other signal quality monitoring techniques, of a type known in the art, may also or alternatively be used. When signal degradation is detected by receiver 104R of Node B:

1. Node B will send an Abort Sequence with retransmission.
2. Node A will send a complementary reply of Basic Accept (BA_ACC) or Basic Reject (BA_RJT) with an option of providing additional information on the current set of coefficient values. For the transmit adaptive equalization process to successfully execute, Node A must accept. If Node A does not accept, no transmit adaptive equalization is performed.
3. Node B will then send the BLS command of FIG. 3 to Node A. This command is a request to Node A to adjust the transmit equalization. As indicated previously, the command will generally specify one or more parameters to be adjusted for the particular equalization algorithm in use. For example, in the case of FIR filter equalization, it may provide adjustment to the coefficients for the supported number of taps with an action of increment, decrement, or hold, for each tap, as described in conjunction with FIG. 4.

This iterative process will converge to equalization parameters leading to the desired signal quality at the receiver.

It is assumed in this embodiment that a set of default parameters will be used to provide sufficient signal quality to allow performance of the adaptive equalization process using the proposed link services commands. Therefore, as indicated previously, this embodiment assumes that the link between Node A and Node B is in an operational state when the transmit adaptive equalization process is carried out. Suitable default parameters may be determined in a straightforward manner, consistent with conventional practice.

An illustrative embodiment of the invention based on an example ELS command format will now be described.

During N_Port login, common services parameters are exchanged through an ELS request and reply process. The ELS request and reply are encapsulated in the Fibre Channel frame as a "Log In" payload along with a standard six-word header that starts with Start Of Frame (SOF starting with the K28.5 comma character) and ends with End Of Frame (EOF ending with the K28.5 comma character).

Figure 5:
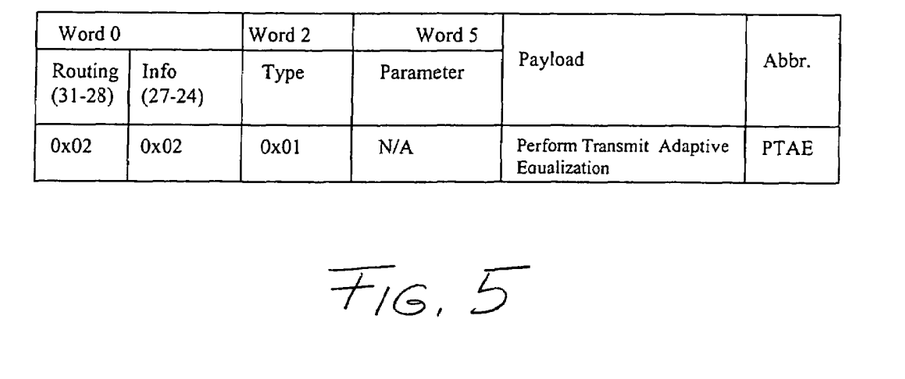
FIGS. 5 and 6 show an Extended Link Services (ELS) command format for performance of transmit adaptive equalization in accordance with an illustrative embodiment of the invention.

FIGS. 5 and 6 show a PTAE command format for an ELS technique of the invention. The format as shown in FIG. 5 includes an otherwise conventional six-word Fibre Channel frame header, with routing information in bits 31-28 of Word 0, an information field in bits 27-24 of Word 0, and a type indicator in bits 24-31 of Word 2. The routing information is 0x02, which indicates extended link data. The information field is 0x02, defining a request command. The type indicator is 0x01, which indicates ELS. Again, other frame header values such as source, destination, sequence, exchange, etc. will be set in a conventional manner.

The parameter field is not utilized for transmit adaptive equalization in this embodiment. Instead, the PTAE command and its associated actions are transmitted in the frame payload, shown in FIG. 6. Currently, request commands up to 0x7E are defined in the Fibre Channel standard, while values beyond 0x7E are reserved. Thus, the PTAE command in this example utilizes the value 0x7F, which is carried by Byte 0 of the payload. This is a new command code, not utilized in conventional implementations of the Fibre Channel standard, and denotes the PTAE command in accordance with the present embodiment of the invention. Of course, other reserved values could be used in other embodiments. Bytes 1 and 2 of the payload carry the parameters that specify the associated actions of the PTAE command. These may include, by way of example, the coefficient increment, decrement, or hold actions as defined in FIG. 4.

Figure 6:
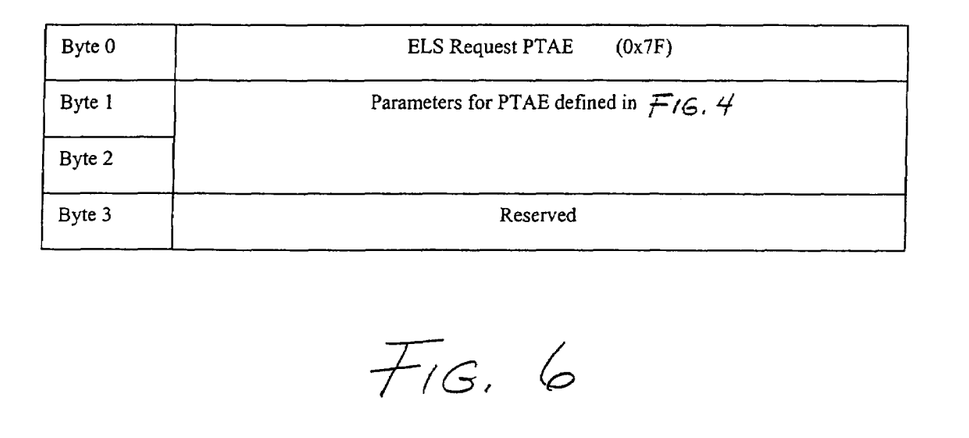

The ELS PTAE command described in conjunction with FIGS. 5 and 6 may be sent after N_Port login.

The ELS technique as implemented by node 102 (Node A) and node 104 (Node B) of system 100 or system 100' generally proceeds as follows. After a Fibre Channel link is established between Node A and Node B, the receiver 104R of Node B monitors received signal quality. When signal degradation is detected by receiver 104R of Node B:

1. Node B will send an Abort Sequence with retransmission.

2. Node A will send a complementary reply of Basic Accept (BA_ACC) or Basic Reject (BA_RJT) with an option of providing additional information on the current set of coefficient values. For the transmit adaptive equalization process to successfully execute, Node A must accept. If Node A does not accept, no transmit adaptive equalization is performed.

3. Node B will then send the ELS command of FIGS. 5 and 6 to Node A. This command is a request to Node A to adjust the transmit equalization. As in the BLS embodiment, the command will generally specify one or more parameters to be adjusted for the particular equalization algorithm in use, such as actions for increment, decrement, or hold actions for specified FIR filter tap coefficients.

4. If Node A accepts the request, Node A will perform the transmit equalization according to the parameters provided with the request. Otherwise, Node A rejects the request and will not perform the transmit equalization. In either case, Node A replies accordingly to Node B.

Like the BLS process, this iterative ELS process will converge to equalization parameters leading to the desired signal quality at the receiver. It is also assumed in this embodiment that a set of default parameters will be used to provide sufficient signal quality to allow performance of the adaptive equalization process using the proposed link services commands. Therefore, as indicated previously, this embodiment assumes that the link between Node A and Node B is in an operational state when the transmit adaptive equalization process is carried out.

Figure 7:
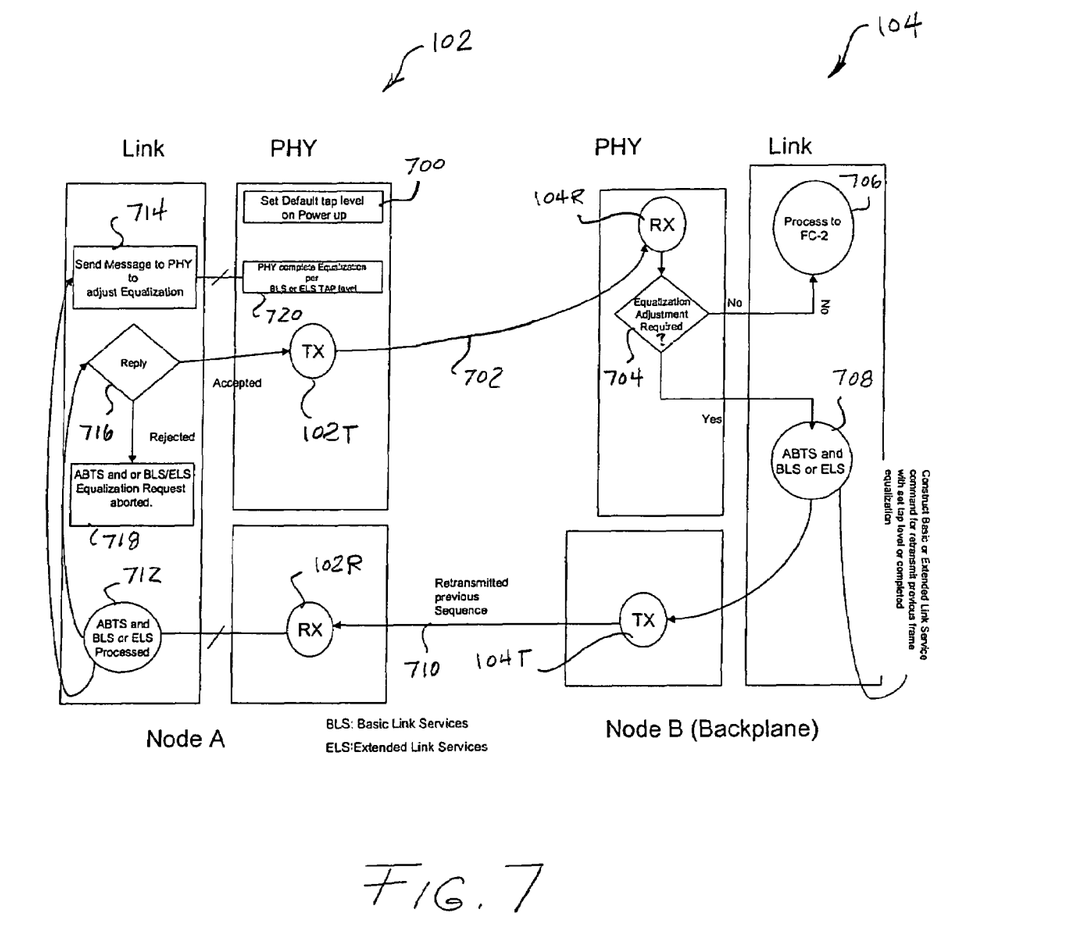
FIG. 7 is a flow diagram illustrating one possible implementation of transmit adaptive equalization using the BLS command approach of FIG. 3 or the ELS command approach of FIGS. 5 and 6.

FIG. 7 shows an example flow diagram for BLS and ELS techniques the same as or similar to those described above. In this example, each of Node A and Node B of system 100 or 100' is separated into a link layer portion and a physical layer (PHY) portion of the Fibre Channel standard as indicated.

Prior to the start of the transmit adaptive equalization process, the transmitter 102T of Node A exchanges information with receiver 104R of Node B relating to speed negotiation, primitives, and other functions until N_Port login. An operational Fibre Channel link is then established between Node A and Node B.

As indicated generally at 702, a signal is transmitted from transmitter 102T of Node A to receiver 104R of Node B.

In step 704, a determination is made based on an evaluation of the quality of the received signal as to whether or not equalization adjustment is required. If not, FC-2 processing is initiated as indicated at step 706. Otherwise, in step 708, a BLS or ELS command is constructed for retransmission of the previous frame with adjusted tap coefficients or an indication of completed adjustment is provided. An Abort Sequence (ABTS) and the associated command, specifying retransmission of the previous sequence with adjusted parameters, is sent from the transmitter 104T of Node B to the receiver 102R of Node A as indicated at step 710.

In step 712, Node A processes the ABTS and the BLS or ELS command. This will result in a message being sent to the PHY portion of Node A to adjust the equalization, as indicated at step 714.

In step 716, the type of reply is determined. If a determination is made in step 716 to reject the equalization adjustment request, the request is aborted in step 718. Otherwise, the request is accepted. As mentioned previously herein, for the transmit adaptive equalization process to successfully execute, Node A must accept. If Node A does not accept, no transmit adaptive equalization is performed. A suitable reply will be generated by the link layer portion of Node A and sent via transmitter 102T of Node A to receiver 104R of Node B. If the request is accepted, the requested adjustment is made as indicated in step 720.

The monitoring of received signal quality and adjustment of equalization parameters may be repeated until a desired received signal quality is achieved.

Of course, the particular process steps of FIG. 7 may be altered in other embodiments of the invention.

Advantageously, the present invention in the illustrative embodiments described above can accommodate higher Fibre Channel data rates, such as 8 Gbps, 16 Gps and higher, without the need for hardware infrastructure upgrades. In addition, substantially improved performance relative to conventional receive-only equalization is provided, with minimal impact to the existing protocols of the Fibre Channel standard. Furthermore, the transceiver hardware area and power consumption required for equalization are considerably reduced.

It should be noted that transmit adaptive equalization of the type described in conjunction with the illustrative embodiments above is particularly beneficial when applied after the Fibre Channel link between Node A and Node B has first become operational. However, received signal quality may vary as a function of time, subsequent to such an initial phase, due to variations in temperature, humidity and other operating conditions.

In a typical Fibre Channel system, when two nodes, such as Node A and Node B of system 100 or 100', are active but there is no data to send between the nodes, the transmitters of Nodes A and B will send "transmission words" to maintain elasticity buffer and byte alignment, and overall synchronization with the respective receivers at the other ends of the link. These transmission words, also referred to as fill words, are usually primitive signals such as Idle. These Idle signals are more generally referred to herein as idle ordered sets.

Therefore, in accordance with another aspect of the invention, the system 100 of FIG. 1 or 100' of FIG. 2 may be configured such that received signal quality is measured periodically during normal operation, and transmit adaptive equalization applied as needed to maintain a desired signal quality over time. Such continuous transmit adaptive equalization may be implemented, by way of example, using the BLS or ELS command formats as described above, or other techniques, such as ordered sets.

More specifically, a continuous transmit adaptive equalization embodiment of this type may be configured such that the receiver 104R of Node B periodically monitors the quality of signals received from transmitter 102T of Node A, and based on the signal quality determines whether the transmitter of Node A should modify its equalization parameters. If an adjustment is needed, it may be carried out using link services command formats, ordered sets or other mechanisms.

By way of example, such periodic readjustments of the Node A transmitter equalization parameters may be carried out during periods of time for which the serial data link between Node A and Node B is otherwise idle. Idle ordered sets may be transmitted by Node B to Node A during this transmit adaptive equalization process. Steps should be taken to prevent Node A from transmitting data during the equalization process, or to buffer any such data at Node B, until the equalization process is complete. It should be noted that if the data is buffered, and a determination is made that adjustments in equalization parameters are needed, the buffered data may need to be retransmitted. Other configurations of continuous transmit adaptive equalization in accordance with the invention may be used.

The present invention may be implemented in the form of one or more integrated circuits. For example, a given system node in accordance with the invention may be implemented as one or more integrated circuits comprising at least one processor and at least one memory. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

The present invention may also be implemented at least in part in the form of one or more software programs that, within a given node, are stored in memory and run on a processor. Such node processor and memory elements may comprise one or more integrated circuits.

Again, it should be emphasized that the embodiments of the invention as described herein are intended to be illustrative only. For example, the Fibre Channel interface used in the illustrative embodiments may be replaced with another type of standard serial data channel interface, or a non-standard serial data channel interface, as well as combinations of standard and non-standard interfaces. Also, the particular arrangements of system devices, command formats, and adaptive equalization processes as shown in the figures may be varied in alternative embodiments. These and numerous other alternative embodiments within the scope of the following claims will be readily apparent to those skilled in the art.

What is claimed is:

1. An apparatus for use in a communication system having a plurality of nodes, the apparatus comprising:

a first node, the first node comprising a transmitter configured for communication with a receiver of a second node and a receiver configured for communication with a transmitter of the second node;

the first node being operative: (i) to receive in the first node receiver from the transmitter of the second node, responsive to a signal transmitted by the transmitter of the first node to the receiver of the second node, information specifying an adjustment to one or more equalization parameters of the transmitter of the first node, and (ii) to adjust the one or more equalization parameters in accordance with the received information;

wherein the information specifying an adjustment to one or more equalization parameters of the transmitter of the first node comprises a request command transmitted utilizing a link services command format of one of at least a first type and a second type, the request command comprising a command code and a parameter field specifying a particular action;

wherein if the link services command format is of the first type, the request command is inserted in a frame header; and wherein if the link services command format is of the second type, the request command is inserted in a frame payload.

2. The apparatus of claim 1 wherein the first node is coupled to the second node via a bidirectional serial data channel.

3. The apparatus of claim 1 wherein the first node is configured to communicate with the second node over a Fibre Channel link.

4. The apparatus of claim 1 wherein the second node evaluates signal quality of the signal transmitted by the transmitter of the first node, and determines the information specifying the adjustment to the one or more equalization parameters based on the signal quality evaluation.

5. The apparatus of claim 1 wherein the process of transmitting a signal and receiving information specifying an adjustment to one or more equalization parameters is repeated until signal quality of a given transmitted signal as received at the second node is determined to meet one or more designated criteria.

6. The apparatus of claim 1 wherein the one or more equalization parameters comprise a plurality of tap coefficients of a filter associated with the transmitter of the first node.

7. The apparatus of claim 6 wherein the filter comprises a finite impulse response filter.

8. The apparatus of claim 1 wherein the information specifying an adjustment to one or more equalization parameters of the transmitter of the first node comprises for a particular one of a plurality of coefficients at least one of an increment coefficient action, a decrement coefficient action, and a hold coefficient action.

9. The apparatus of claim 1 wherein the link services command format is compliant with the Fibre Channel standard.

10. The apparatus of claim 1 wherein the link services command format of the first type comprises a Basic Link Services (BLS) command format.

11. An apparatus for use in a communication system having a plurality of nodes, the apparatus comprising:

a first node, the first node comprising a transmitter configured for communication with a receiver of a second node and a receiver configured for communication with a transmitter of the second node;

the first node being operative: (i) to receive in the first node receiver from the transmitter of the second node, responsive to a signal transmitted by the transmitter of the first node to the receiver of the second node, information specifying an adjustment to one or more equalization parameters of the transmitter of the first node, and (ii) to adjust the one or more equalization parameters in accordance with the received information;

wherein the information specifying an adjustment to one or more equalization parameters of the transmitter of the first node comprises a request command transmitted utilizing a Basic Link Services (BLS) command format; and wherein the request command is inserted in a frame header, and comprises a command code and a parameter field specifying a particular action.

12. The apparatus of claim 1 wherein the link services command format of the second type comprises an Extended Link Services (ELS) command format.

13. An apparatus for use in a communication system having a plurality of nodes, the apparatus comprising:

a first node, the first node comprising a transmitter configured for communication with a receiver of a second node and a receiver configured for communication with a transmitter of the second node;

the first node being operative: (i) to receive in the first node receiver from the transmitter of the second node, responsive to a signal transmitted by the transmitter of the first node to the receiver of the second node, information specifying an adjustment to one or more equalization parameters of the transmitter of the first node, and (ii) to adjust the one or more equalization parameters in accordance with the received information;

wherein the information specifying an adjustment to one or more equalization parameters of the transmitter of the first node comprises a request command transmitted utilizing an Extended Link Services (ELS) command format; and wherein the request command is inserted in a frame payload, and comprises a command code and a parameter field specifying a particular action.

14. The apparatus of claim 1 wherein the adjustment of the one or more equalization parameters of the transmitter of the first node is applied after a Fibre Channel link is established between the first and second nodes.

15. The apparatus of claim 1 wherein the adjustment of the one or more equalization parameters of the transmitter of the first node is repeated periodically so as to provide substantially continuous transmit adaptive equalization.

16. The apparatus of claim 1 wherein a transmit adaptive equalization process implemented by the first and second nodes is carried out during an otherwise idle period in data communication between the first and second nodes.

17. The apparatus of claim 1 wherein the first node is implemented at least in part as an integrated circuit.

18. An integrated circuit for use in a communication system having a plurality of nodes, the integrated circuit implementing at least a portion of a first node, the first node comprising a transmitter configured for communication with a receiver of a second node and a receiver configured for communication with a transmitter of the second node, the first node being operative: (i) to receive in the receiver of the first node from the transmitter of the second node, responsive to a signal transmitted by the transmitter of the first node to the receiver of the second node, information specifying an adjustment to one or more equalization parameters of the transmitter of the first node, and (ii) to adjust the one or more equalization parameters in accordance with the received information;

wherein the information specifying an adjustment to one or more equalization parameters of the transmitter of the first node comprises a request command transmitted utilizing a link services command format of one of at least a first type and a second type, the request command comprising a command code and a parameter field specifying a particular action;

wherein if the link services command format is of the first type, the request command is inserted in a frame header; and wherein if the link services command format is of the second type, the request command is inserted in a frame payload.

19. A method for use in a communication system having a plurality of nodes, including at least a first node comprising a transmitter configured for communication with a receiver of a second node and a receiver configured for communication with a transmitter of the second node, the method comprising the steps of:

receiving in the receiver of the first node from the transmitter of the second node, responsive to a signal transmitted by the transmitter of the first node to the receiver of the second node, information specifying an adjustment to one or more equalization parameters of the transmitter of the first node; and adjusting the one or more equalization parameters in accordance with the received information;

wherein the information specifying an adjustment to one or more equalization parameters of the transmitter of the first node comprises a request command transmitted utilizing a link services command format of one of at least a first type and a second type, the request command comprising a command code and a parameter field specifying a particular action;

wherein if the link services command format is of the first type, the request command is inserted in a frame header; and wherein if the link services command format is of the second type, the request command is inserted in a frame payload.

20. An article of manufacture comprising a machine-readable storage medium having one or more software programs stored therein, for use in a communication system having a plurality of nodes, including at least a first node comprising a transmitter configured for communication with a receiver of a second node and a receiver configured for communication with a transmitter of the second node, the first node being operative under control of the one or more software programs to perform the steps of:

receiving in the receiver of the first node from the transmitter of the second node, responsive to a signal transmitted by the transmitter of the first node to the receiver of the second node, information specifying an adjustment to one or more equalization parameters of the transmitter of the first node; and adjusting the one or more equalization parameters in accordance with the received information;

wherein the information specifying an adjustment to one or more equalization parameters of the transmitter of the first node comprises a request command transmitted utilizing a link services command format of one of at least a first type and a second type, the request command comprising a command code and a parameter field specifying a particular action;

wherein if the link services command format is of the first type, the request command is inserted in a frame header; and wherein if the link services command format is of the second type, the request command is inserted in a frame payload.

21. An apparatus for use in a communication system having a plurality of nodes, the apparatus comprising:

a first node comprising a transmitter configured for communication with a receiver of a second node and a receiver configured for communication with a transmitter of the second node;

the first node being operative to adjust one or more equalization parameters of its associated transmitter, responsive to information received from the second node in conjunction with a transmit adaptive equalization process, the process being implemented substantially during an otherwise idle period in data communication between the first and second nodes;

wherein the information received from the second node comprises a request command transmitted utilizing a link services command format of one of at least a first type and a second type, the request command comprising a command code and a parameter field specifying a particular action;

wherein if the link services command format is of the first type, the request command is inserted in a frame header; and wherein if the link services command format is of the second type, the request command is inserted in a frame payload.

* * * * *

UNITED STATES PATENT AND TRADEMARK OFFICE
CERTIFICATE OF CORRECTION

| | | |
|---|---|---|
| PATENT NO. | : 7,443,798 B2 | |
| APPLICATION NO. | : 10/933708 | |
| DATED | : October 28, 2008 | |
| INVENTOR(S) | : A. U. Ahmed et al. | |

It is certified that error appears in the above-identified patent and that said Letters Patent is hereby corrected as shown below:

On the Title Pg Item (74), "Rayn," should be --Ryan,--.

The Title Page, showing an illustrative figure, should be deleted and substitute therefor the attached title page.

In the drawings:

Please delete drawing sheets 1-4 and insert the attached drawing sheets 1-4.

Signed and Sealed this

Twenty-sixth Day of January, 2010

David J. Kappos
*Director of the United States Patent and Trademark Office*

United States Patent
Ahmed et al.

(10) Patent No.: US 7,443,798 B2
(45) Date of Patent: Oct. 28, 2008

(54) TRANSMIT ADAPTIVE EQUALIZATION FOR COMMUNICATION SYSTEM WITH ONE OR MORE SERIAL DATA CHANNELS

(75) Inventors: Ali U. Ahmed, Macungie, PA (US); Robert D. Brink, Coopersburg, PA (US); Lane A. Smith, Easton, PA (US)

(73) Assignee: Agere Systems Inc., Allentown, PA (US)

(*) Notice: Subject to any disclaimer, the term of this patent is extended or adjusted under 35 U.S.C. 154(b) by 820 days.

(21) Appl. No.: 10/933,708

(22) Filed: Sep. 3, 2004

(65) Prior Publication Data
US 2006/0050726 A1 Mar. 9, 2006

(51) Int. Cl.
*G01R 31/08* (2006.01)
(52) U.S. Cl. .............. 370/236; 370/410; 375/220; 375/233
(58) Field of Classification Search .......... 370/252, 370/236, 465, 437; 375/135–136, 146–147, 375/219–223, 229–236
See application file for complete search history.

(56) References Cited

U.S. PATENT DOCUMENTS 5,598,541 A * 1/1997 Malladi .............. 710/106
7,277,477 B1 * 10/2007 Ahmad .............. 375/220
2004/0003062 A1 * 1/2004 Sharma et al. ........ 709/220
2004/0037264 A1 * 2/2004 Khawand ............ 370/349
2005/0031347 A1 * 2/2005 Soto et al. ........... 398/58
2005/0089333 A1 * 4/2005 Roe et al. ........... 398/139
2006/0067387 A1 * 3/2006 Ahmed et al. ........ 375/219

OTHER PUBLICATIONS

U.S. Appl. No. 10/955,997, filed Sep. 30, 2004, A.U. Ahmed et al., "Transmit Adaptive Equalization Using Ordered Sets."

* cited by examiner

*Primary Examiner*—Chi H. Pham
*Assistant Examiner*—Thai D. Hoang
(74) *Attorney, Agent, or Firm*—Ryan, Mason & Lewis, LLP (57) ABSTRACT

In a communication system comprising first and second nodes, a transmit adaptive equalization technique is implemented. The first and second nodes may communicate over a Fiber Channel link or other medium. The first and second nodes comprise respective transmitter and receiver pairs, with the transmitter of the first node configured for communication with the receiver of the second node and the receiver of the first node configured for communication with the transmitter of the second node. The first node receiver is operative to receive from the second node transmitter, responsive to a signal transmitted by the first node transmitter to the second node receiver, information specifying an adjustment to one or more equalization parameters of the first node transmitter. The first node adjusts the equalization parameter(s) in accordance with the received information.

21 Claims, 4 Drawing Sheets

FIG. 1

FIG. 2

| WORD 0 | | WORD 2 | WORD 5 | DESCRIPTION | ABBR. |
|---|---|---|---|---|---|
| ROUTING (31-28) | COMMAND (27-24) | TYPE | PARAMETER | | |
| 0x08 | 0x7 | 0x00 | ACTION | PERFORM TRANSMIT ADAPTIVE EQUALIZATION | PTAE |

FIG. 3

FIG. 4

| WORD 0 | | WORD 2 | WORD 5 | PAYLOAD | ABBR. |
|---|---|---|---|---|---|
| ROUTING (31-28) | COMMAND (27-24) | TYPE | PARAMETER | | |
| 0x02 | 0x02 | 0x01 | N/A | PERFORM TRANSMIT ADAPTIVE EQUALIZATION | PTAE |

FIG. 5

| BYTE 0 | ELS REQUEST PTAE (0x7F) |
|---|---|
| BYTE 1 | PARAMETERS FOR PTAE DEFINED IN FIG. 4 |
| BYTE 2 | |
| BYTE 3 | RESERVED |

FIG. 6

FIG. 7